June 27, 1939.  A. N. BRUNSON  2,164,051
SURVEYING INSTRUMENT
Filed Sept. 16, 1938   2 Sheets-Sheet 1
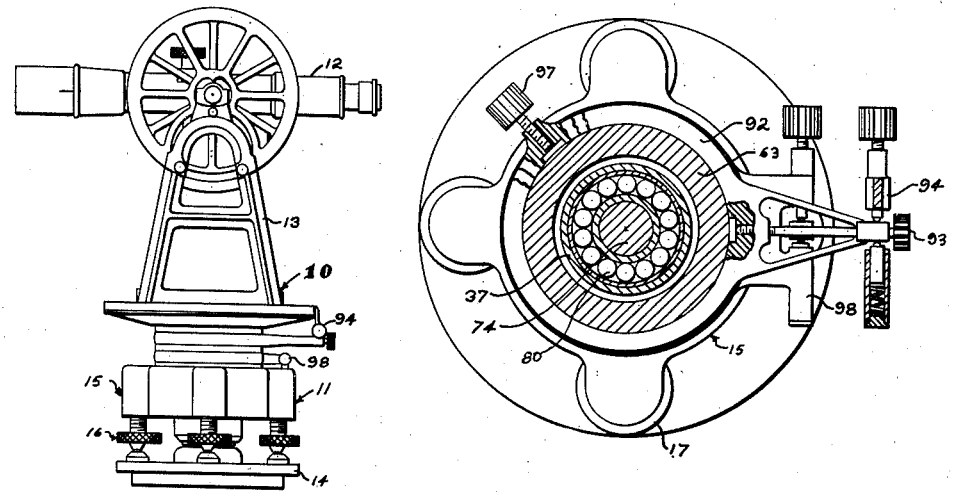
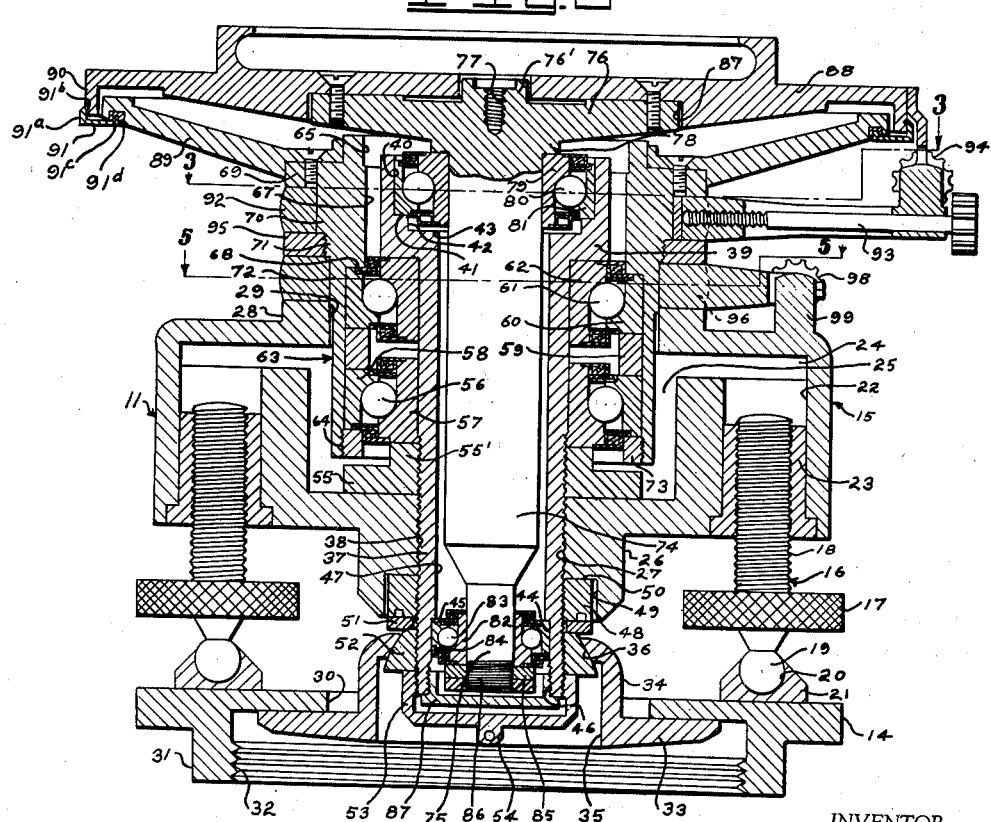
INVENTOR.
A. N. BRUNSON
BY
ATTORNEY.

June 27, 1939.  A. N. BRUNSON  2,164,051
SURVEYING INSTRUMENT
Filed Sept. 16, 1938   2 Sheets-Sheet 2
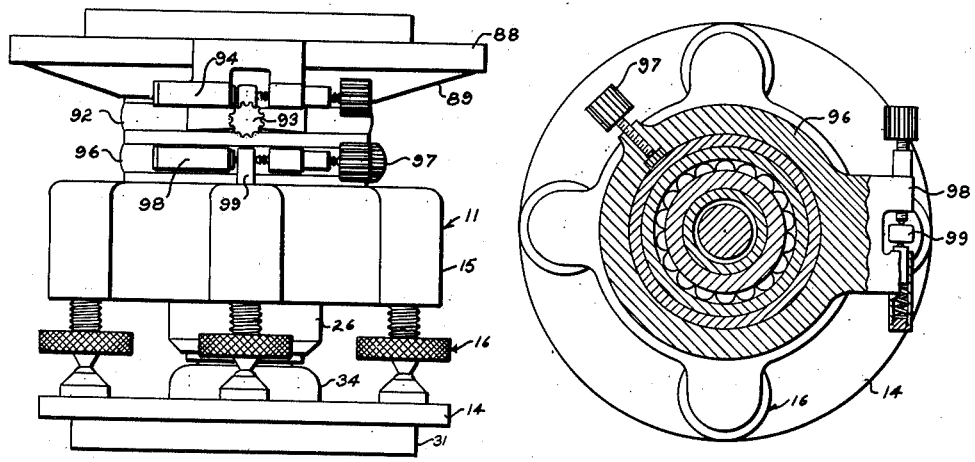
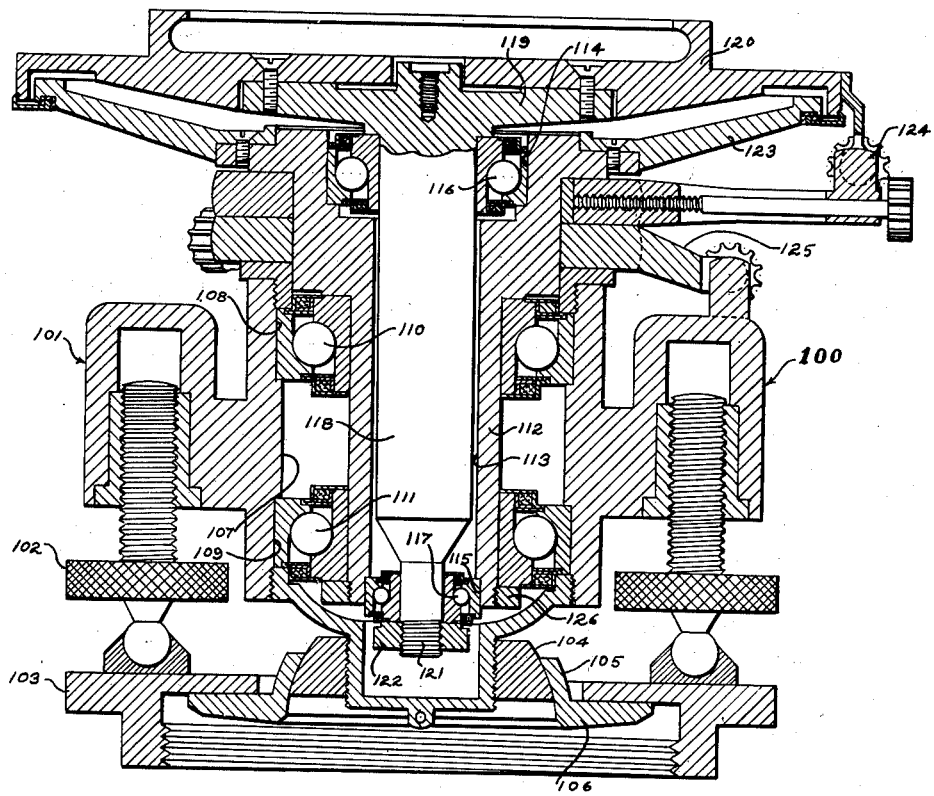
INVENTOR.
A. N. BRUNSON
BY
ATTORNEY.

Patented June 27, 1939

2,164,051

UNITED STATES PATENT OFFICE 2,164,051

SURVEYING INSTRUMENT

Amber N. Brunson, Kansas City, Mo.

Application September 16, 1938, Serial No. 230,241

11 Claims. (Cl. 33—46)

This invention relates to improvements in surveying instruments.

The general object of the invention is to provide an improved surveying instrument such as a transit having novel features of construction which provide greater accuracy than is obtainable with former instruments.

A more specific object of my invention is to provide a surveyor's transit wherein the spindle is mounted in antifriction bearings.

Another object of the invention is to provide a surveyor's transit wherein the lower plate and socket assembly is mounted on anti-friction bearings.

A further object of the invention is to provide a surveyor's transit which may be operated with accuracy at low temperatures.

An additional object of the invention is to provide an improved surveyor's transit wherein the various essential working parts of the base are dust-proof.

Another object of the invention is to provide an improved surveyor's transit with a base designed so as to remain accurate irrespective of expansion and contraction of metals.

Other objects and advantages of this invention will be apparent from the following description taken in connection with the accompanying drawings, wherein:

Fig. 1 is a side elevation of a surveyor's transit embodying the features of my invention;

Fig. 2 is an enlarged vertical section of the instrument shown in Fig. 1;

Fig. 3 is a section taken on line 3—3 of Fig. 2 on a reduced scale;

Fig. 4 is a view similar to Fig. 1 on an enlarged scale showing the base with the latter revolved through 90°;

Fig. 5 is a section taken on line 5—5 of Fig. 2 on a reduced scale; and

Fig. 6 is a vertical section through a modification of my invention.

In the accompanying drawings I have shown my invention as embodied in a transit which is indicated generally at 10. As shown the transit includes a base 11, the usual telescope 12 and support members 13.

The base 11 includes a foot plate 14 on which a leveling head 15 is supported by a plurality of leveling screws 16. Each of the leveling screws 16 includes an enlarged head 17 having a threaded portion 18 thereabove and a depending portion which terminates in a ball member 19. Each of the ball members 19 engages a socket 20 of a foot member 21 which engages the foot plate 14. Opening through the under face thereof the leveling head 15 has a plurality of vertical apertures 22 in which threaded bushings 23 are positioned to receive the threaded portions 18 of the leveling screws 16.

The leveling head 15 has a cavity 24 therein and therebelow a central recess 25 opening upwardly into the cavity 24. Integral with the leveling head 15 and depending thereof I provide a central downwardly projecting hub 26 having a threaded aperture 27 opening into the recess 25. Projecting from the upper face of the leveling head 15 is a central hub 28 having an aperture 29.

The foot plate 14 includes a central aperture 30 and on the under face thereof includes a downwardly projecting hub 31 having a central threaded aperture 32.

Within the aperture 30 of the hub 31 I provide a shifting plate 33 which engages the lower face of the foot plate 14. The shifting plate 33 has an upwardly projecting hub 34 of a diameter considerably smaller than the diameter of the aperture 30 so that the shifting plate 33 may be laterally moved relative to the foot plate 14. The hub 34 has a lower recess 35 and an upper reduced recess 36 having inner walls shaped as a zone of a sphere.

Within the threaded aperture 27 of the hub 26 is positioned a spindle bearing housing 37 having a lower threaded portion 38 engaging the threaded aperture 27 and extending downwardly therefrom. The spindle bearing housing 37 extends upwardly through the aperture 29 and has an upper enlarged shoulder portion 39. Opening through the upper end thereof the spindle bearing housing 37 has a recess 40 therein forming a shoulder 41 and opening into the recess 40 is a recess 42 forming a shoulder 43. Opening through the lower end the housing 37 includes a recess 44 forming a shoulder 45. The recess 44 has a lower threaded portion 46. The housing 37 includes a central aperture 47 therein which at the upper end opens into the recess 42 and at the lower end opens into the recess 44.

Upon the threaded portion 38 and below the hub 26 I position a nut 48 fitting loosely within a recess 49 in the lower end of the hub 29. The nut 48 engages a shoulder 50 at the inner end of the recess 49.

Below the nut 48 and fitting upon the threaded portion 38 but not threadedly engaging same is a spacing ring 51. Upon the threaded portion 38 and below the spacing ring 51 I arrange a nut 52 having a periphery shaped as a zone of a sphere and engaging the spherical walls of the reduced recess 36.

A cap member 53 engages the threaded portion 38 below the nut 52 and has a depending ring member 54 adapted to engage a standard plumb bob line.

Above the hub 26 and engaging the threaded portion 38 I provide a nut 55 having a reduced upper portion 55'.

Mounted on the spindle bearing housing 37 above the nut 55 and the threaded portion 38 is a standard dustproof radial and axial thrust anti-friction bearing 56 having an inner race 57 and an outer race 58. The inner race 57 engages the housing 37 and at its lower end the race 57 engages the reduced portion 55' of the nut 55.

Above and engaging the upper end of the outer race 58 of the bearing 56 is a spacing ring 59 which engages the lower end of the outer race 60 of another anti-friction bearing 61 similar to the anti-friction bearing 56. The bearing 61 includes an inner race 62 engaging the housing 37 and the shoulder portion 39.

Surrounding the outer races of the bearings 56 and 61 is an outer shell 63 having internal threads 64 at the lower end. At its upper end the shell 63 has a reduced aperture 65 below which is a further reduced aperture 67 forming the shoulder 68. The shoulder 68 engages the upper end of the outer race 60 of the bearing 61. At its upper end the shell 63 has a flange 69 below which ranges a tier of shoulder portions 70, 71, 72, the shoulder portion 71 being threaded while the lower part of the shoulder portion 72 engages the aperture 29 in the hub 28.

Engaging the lower internal threads 64 and the lower portion of the outer race 58 of the bearing is a ring 73.

A spindle 74 is centrally positioned in the spindle bearing housing 37 and has a lower reduced portion 75 and an upper flange portion 76. The flange portion 76 has a central boss 76' with a threaded aperture 77 adapted to engage similarly threaded member, not shown, of the instrument 11. Below the flange portion 76 is a shoulder 78 which engages the upper end of the inner race 79 of an anti-friction bearing 80 similar to the bearings 56 and 61 and shown as of reduced size.

The lower end of the outer race 81 of the bearing 80 engages the shoulder 41 within the spindle bearing housing 37. Positioned on the reduced portion 75 of the spindle 74 is the inner race 82 of an anti-friction bearing 83. The anti-friction bearing 83 is similar to the bearings 56, 61 and 80 but not necessarily of the same size. The upper end of the outer race 84 of the bearing 83 engages the shoulder 45 within the spindle bearing housing 37. The lower end of the inner race 82 of the bearing 83 is engaged by nuts 85 engaging threads 86 on the reduced portion 75 of the spindle 74. A dust-proof cap 87 engages the threads 46 thus sealing the spindle bearing housing.

The flange portion 76 of the spindle 74 rigidly engages a socket 87 in an upper plate 88 which engages the instrument 10 in the usual manner.

Rigidly positioned on the flange portion 69 of the shell 63 is a lower plate 89 the periphery of which is within a downwardly projecting rim 90 of the upper plate which carries a dust-proof annular closure 91 which prevents foreign material entering between the upper plate 88 and the lower plate 89. The closure 91 includes an upwardly extending peripheral rim 91a which is spun into a groove 91b in the downwardly projecting rim 90.

The closure 91 also includes an upwardly extending inner rim 91c which fits slidably in a felt-lined groove 91d in the underside of the lower plate 89.

A clamp ring 92 is positioned on the shoulder portion 70 and may be clamped thereto through a clamp screw assembly 93 of the usual type.

The clamp ring 92 is connected in the usual manner to the upper plate 88 by means of a slow motion assembly 94 of the usual type consisting essentially of a manually operated screw in conjunction with a spring loaded plunger as is clearly indicated in the drawings.

Below the clamp ring 92 and engaging the threaded shoulder portion 71 is a retaining nut 95

A clamp ring 96 is positioned on the shoulder portion 72 below the retaining nut 95. The clamp ring 96 includes the usual clamp screw assembly 97 and a slow motion assembly 98 connecting the shell 63 to the leveling head 15 through an upstanding lug 99 thereon. The slow motion assembly 98 is similar to the slow motion assembly 94 described above.

As the aperture 29 in the hub 28 engages only a small portion of the shoulder portion 72, any dirt which may enter around the clamp ring 96 will drop down into the recess 25.

In assembling it will be seen that the outer races 58 and 60 of the bearings 56 and 61 respectively are held permanently in relative position while the inner races 57 and 62 are drawn together by the nut 55. In the same manner the inner races 79 and 82 of the bearings 80 and 83 respectively are urged toward each other by the nuts 85 and the outer races 81 and 84 are held permanently in relative spaced positions.

In this way metal to metal contact of bearing surfaces is insured eliminating any inaccuracies due to oil film while still allowing free motion of the parts concerned. Binding due to low temperatures which sometimes occurs in the tapered type of bearing is also eliminated, while the construction is sufficiently rigid to insure no loss of accuracy due to flexure.

In use the device 10 is mounted on the usual type of tripod and tripod head, not shown, and is operated in the ordinary manner, the base being centered by use of the shifting plate 33, the leveling head 15 adjusted by the leveling screws 16 and the customary relative movements between the upper plate, lower and leveling head are accomplished in the usual manner.

In Fig. 6 I have indicated an instrument base, which embodies a modified form of my invention, generally at 100. The base 100 includes a leveling head 101 supported by a plurality of leveling screws 102 on a foot plate 103 and is connected to the foot plate 103 in the usual manner through a semi-spherical member 104 engaging a companion seat portion 105 on a shifting plate 106 which engages the foot plate 103 in the ordinary manner.

The leveling head 101 includes the usual central aperture 107 having an upper recess 108 and a lower recess 109 therein, in each recess I mount a standard type of radial and axial thrust dust-proof anti-friction bearing. These bearings 110 and 111, respectively, inwardly engage a spindle bearing housing 112 having a central aperture 113 and an upper recess 114 and a lower recess 115. Mounted in the recesses 114 and 115 are two bearings 116 and 117, respectively, similar to the bearings 110 and 111 although not necessarily the same size.

The bearings 116 and 117 inwardly engage a spindle 118 having an upper flange 119 engaging the usual upper plate 120 and a lower reduced threaded portion 121 carrying a nut 122 engaging the inner race of the bearing 117. The spindle bearing housing 112 carries the usual lower plate 123, clamp ring and slow motion assembly 124 connecting the upper plate 120 and the lower plate 123, and clamp ring and slow motion assembly 125 connecting the spindle bearing housing 112 and the leveling head 101.

As will be seen from the drawings the outer races of the bearings 110 and 111 are held permanently in spaced position and the inner races urged toward each other by the nut 126 on the lower end of the spindle bearing housing 112 and in like manner the outer races of the bearings 116 and 117 are held permanently in spaced position and the inner races urged toward each other by the nut 122.

The device 100 is used in conjunction with the usual tripod and instrument.

From the foregoing description it will be evident that I have invented a novel surveying instrument which is superior in many respects to former types.

Having thus described my invention I claim:

1. In a surveying instrument, a leveling head, a spindle bearing housing adjustably mounted on said leveling head, a spindle member within said spindle bearing housing, an anti-friction member positioned within and engaging said leveling head and said spindle bearing housing, another antifriction member engaging said spindle bearing housing and said spindle.

2. In a surveying instrument, a leveling head, a spindle bearing housing mounted on said leveling head, a spindle member mounted within said spindle bearing housing, upper and lower spaced anti-friction members positioned within and engaging said leveling head, means on said spindle bearing housing engaging said anti-friction members, other anti-friction members engaging each end of said spindle bearing housing, and means on said spindle engaging said other anti-friction members.

3. In a surveying instrument, a leveling head, a spindle bearing housing mounted on said leveling head, a spindle member mounted within said spindle bearing housing, upper and lower spaced anti-friction members positioned within and engaging said leveling head, adjustable means on said spindle bearing housing engaging and urging said anti-friction members together, other anti-friction members engaging each end of said spindle bearing housing, and adjustable means on said spindle engaging and urging said other anti-friction members together.

4. In a surveying instrument, a leveling head, a spindle bearing housing mounted on said head, said spindle bearing housing having spaced anti-friction members thereon, an outer shell mounted on said leveling head, said anti-friction members engaging said outer shell, a spindle member in said spindle bearing housing and a pair of spaced anti-friction members having their inner portions engaging said spindle, said last mentioned anti-friction members engaging said spindle bearing housing.

5. In a surveying instrument, a leveling head, a spindle bearing housing mounted on said head, said spindle bearing housing having spaced anti-friction members thereon, an outer shell mounted on said leveling head, said anti-friction members engaging said outer shell, a spindle member in said spindle bearing housing and another pair of spaced anti-friction members having their inner portions engaging said spindle, said last mentioned anti-friction members being positioned within and engaging the spindle bearing housing, said first mentioned anti-friction members being disposed between said other pair of anti-friction members.

6. In a surveying instrument, a leveling head, a spindle bearing housing mounted on said head, said spindle bearing housing having spaced anti-friction members thereon, an outer shell mounted on said leveling head, said anti-friction members engaging said outer shell, means on said spindle bearing housing to urge the inner portions of said anti-friction members toward each other, a spindle member in said spindle bearing housing, a pair of spaced anti-friction members having their inner portions engaging said spindle, said last mentioned anti-friction members being positioned within and engaging the spindle bearing housing one at each end thereof, and means on said spindle member to urge the inner portions of said anti-friction members toward each other.

7. In a surveying instrument, a foot plate having a central aperture therein, a leveling head mounted on said foot plate, a shifting plate engaging said foot plate, a spindle bearing housing shiftably mounted on said foot plate, said spindle bearing housing having an upper bearing member and a lower bearing member thereon, an outer shell mounted on said leveling head, said bearing members being positioned within and engaging said outer shell, a spindle member in said spindle bearing housing, a pair of bearing members engaging said spindle, said last mentioned bearing members being positioned within and engaging the spindle bearing housing one at each end thereof.

8. In a surveying instrument, a foot plate having a central aperture therein, a leveling head mounted on said foot plate, a shifting plate engaging said foot plate, a spindle bearing housing shiftably mounted on said foot plate, said spindle bearing housing having an upper anti-friction member and a lower anti-friction member thereon, an outer shell mounted on said leveling head, said anti-friction members being positioned within and engaging said outer shell, means on said outer shell to hold the outer portions of said anti-friction members spaced apart, means on said spindle bearing housing to urge the inner portions of said anti-friction members toward each other, a spindle member in said spindle bearing housing, a pair of anti-friction members having their inner portions engaging said spindle, said last mentioned anti-friction members being positioned within and engaging the spindle bearing housing one at each end thereof, means on said spindle bearing housing to hold the outer portions of said last mentioned anti-friction members in relative spaced position and means on said spindle member to urge the inner portions of said anti-friction members toward each other.

9. In a surveying instrument, a foot plate having a central aperture therein, a leveling head mounted on said foot plate, a plurality of leveling screws disposed between said foot plate and said leveling head, a shifting plate engaging said foot plate and having a hub projecting through said foot aperture plate, said hub having an aperture with a spherical side, a spindle bearing housing, a nut on said spindle bearing housing having a spherical surface engaging the spherical side of said foot plate aperture, said spindle bearing housing having an upper anti-friction member and a lower anti-friction member thereon, an outer shell mounted on said leveling head, said anti-friction members being positioned within and engaging said outer shell, means on said outer shell to hold the outer portions of said anti-friction members spaced apart, means on said spindle bearing housing to urge the inner portions of said anti-friction members toward each other, a spindle member in said spindle bearing housing, a pair of anti-friction members having their inner portions engaging said spindle, said last mentioned anti-friction members being positioned wthn and engaging the spindle bearing housing one at each end thereof, means on said spindle bearing housing to hold the outer portions of said last mentioned anti-friction members in relative spaced position and means on said spindle member to urge the inner portions of said anti-friction members toward each other.

10. In a surveying instrument, a foot plate having a central aperture therein, a leveling head mounted on said foot plate, a plurality of leveling screws disposed between said foot plate and said leveling head, a shifting plate engaging said foot plate and having a hub projecting through said foot aperture plate, said hub having an aperture with a spherical side, a spindle bearing housing, a nut on said spindle bearing housing having a spherical surface engaging the spherical side of said foot plate aperture, said spindle bearing housing having an upper anti-friction member and a lower anti-friction member thereon, an outer shell mounted on said leveling head, said anti-friction members being positioned within and engaging said outer shell, means on said outer shell to hold the outer portions of said anti-friction members spaced apart, means on said spindle bearing housing to urge the inner portions of said anti-friction members toward each other, a spindle member in said spindle bearing housing, a pair of anti-friction members having their inner portions engaging said spindle, said last mentioned anti-friction members being positioned within and engaging the spindle bearing housing one at each end thereof, means on said spindle bearing housing to hold the outer portions of said last mentioned anti-friction members in relative spaced position, means on said spindle member to urge the inner portions of said anti-friction members toward each other, a dust cap closing the lower end of said spindle bearing housing, an upper plate mounted on the upper end of said spindle member, a lower plate mounted on said outer shell and a dust-proof closure disposed between said lower plates.

11. In a surveying instrument, a foot plate having a central aperture therein, a leveling head mounted on said foot plate, a spindle bearing housing shiftably mounted on said foot plate, said spindle bearing housing having an upper anti-friction member and a lower anti-friction member thereon, said anti-friction members being positioned within and directly engaging said leveling head, a spindle member in said spindle bearing housing, a pair of anti-friction members having their inner portions engaging said spindle, said last mentioned anti-friction members being positioned within and engaging the spindle bearing housing one at each end thereof, and means on said spindle member to urge the inner portions of said pair of anti-friction members toward each other.

AMBER N. BRUNSON.